United States Patent [19]
Noll

[11] 3,728,032
[45] Apr. 17, 1973

[54] FLOW CELL FOR SPECTROSCOPIC ANALYSIS OF DENSITY GRADIENTS

[76] Inventor: Hans Noll, 2665 Orrington Ave., Evanston, Ill.

[22] Filed: Oct. 13, 1971

[21] Appl. No.: 188,746

[52] U.S. Cl. ............................. 356/246, 250/43.5 R
[51] Int. Cl. ................................................. G01n 1/10
[58] Field of Search ........................... 356/244, 246; 250/43.5, 218

[56] References Cited

UNITED STATES PATENTS 3,552,865    1/1971    Leung et al ......................... 356/246

*Primary Examiner*—William L. Sikes
*Attorney*—Alexander & Speckman

[57] ABSTRACT

A flow cell having a flow path which is step-free and totally streamlined so that pure laminar flow is achieved therethrough. Analytical resolution and sensitivity is further enhanced by the geometry of the flow path which combines minimal volume with maximal light path. There is likewise disclosed a two part mirror-image construction for reduced cost of manufacture and ease of maintenance.

10 Claims, 5 Drawing Figures

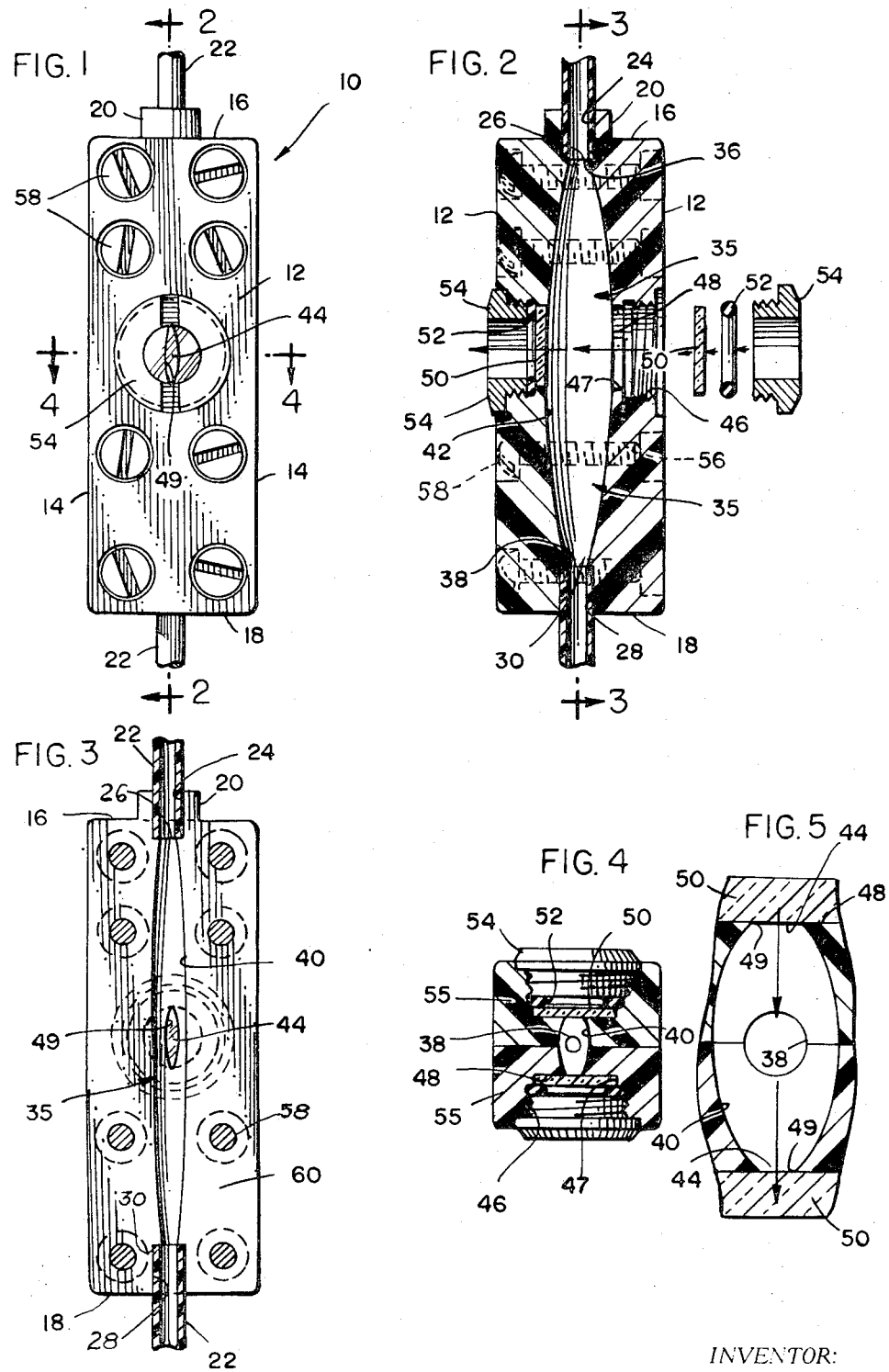

FLOW CELL FOR SPECTROSCOPIC ANALYSIS OF DENSITY GRADIENTS

This invention relates to fractionating procedures and techniques used in biological and biochemical research and particularly to an improved flow cell for continuous spectrophotometric or similar optical analysis of fractions obtained by ultracentrifugation in a density gradient medium.

Fractionation of various biological components by ultracentrifugation is one of the most powerful and widely used techniques in biological and biochemical research. Obtainable fractions include extremely small particles such as viruses and the structural elements of the cell, viz. mitochondria, ribosomes, nuclei, membranes, and the like, and large molecules such as nucleic acids, proteins, and polysaccharides.

More specifically, the resolving of a complex mixture of macromolecules into its individual components by centrifugation through a fluid column stabilized by a density gradient medium has become one of the most important analytical and preparative methods in molecular biology. In a typical application, a small volume of solution containing the molecules to be separated is applied in a thin layer over 3 to 4 ml. of a sucrose gradient fluid prepared in a small centrifuge tube. The centrifuge tube is then placed in a bucket attached to a swinging bucket-type ultracentrifuge rotor and spun at high speed until the individual components of the mixture have separated into sharp bands or zones spaced at various distances 2 from top to bottom of the centrifuge tube. These bands normally are not visible and their detection requires special analytical methods.

In order to evaluate the separation, the gradient fluid heretofore has been most frequently divided into a number of equal fractions by puncturing the tube at the bottom and draining the fluid into a series of test tubes. Each test tube is then assayed for the components of interest by spectrophotometric, chemical or radiological methods. It is apparent, however, that resolution by this cumbersome and time-consuming method of analysis is limited by the number of fractions collected. Thus, for example, two components that may have been separated into two very closely spaced bands would not be recognized as separate if they fall into the same or adjacent tubes for analysis.

Much better resolution is obtainable by a continuous flow process of analysis wherein the fluid of the gradient passes through a monitoring or detection device connected to the recorder of the strip chart type. In the case of macromolecules that absorb either ultraviolet or visible light such analysis may be accomplished by passing the effluent through a flow cell mounted in a spectrophotometer.

Existing flow cells generally are incapable of functioning efficiently in density gradient applications because they give rise to varying degrees of turbulence resulting in loss of resolution and unacceptable levels of optical noise. These undesirable effects may be attributable to the fact that commercially available flow cells have been designed to monitor fluids whose refractive index is either constant or does not change measurably within a volume corresponding to the capacity of the cell. In such applications, turbulent flow is not a problem because it does not affect the intensity of the light beam passing through the fluid.

Where density gradient fluids containing narrow bands of light absorbing material are to be monitored spectrophotometrically, the problem of turbulent flow becomes acute. Even slight disturbances of the laminar flow in the flow cell will produce local changes of refractive index, observable as "schlieren", which cause fluctuations in the energy of the transmitted light beam. The fluctuations are amplified by the photomultiplier tube and register on the strip chart recording as optical noise.

Another undesirable consequence of turbulent flow is the destruction of the band to be analyzed. While both of these deleterious effects might be minimized by reducing the volume of the flow cell, such reduction of cell volume entails shortening of the light path and hence loss of photometric sensitivity.

Insofar as I am aware, the first successful attempt to deal with the problem of turbulent flow and provide a flow cell suitable for spectrophotometric gradient analysis is described in my co-pending application entitled "Flow Cell Holder and Flow Cell For Use Therewith," Serial Number 71,595, filed September 11, 1970, (see also, *Analytical Biochemistry*, 27, 130–149 [1969]). In that structure, the flow cell was provided with adjustable aperture means whereby the light path could be limited to a central portion of the fluid flow path where the effects of any turbulent flow in the cell were either eliminated entirely or greatly minimized. While that structure achieved results not heretofore attainable with prior art flow cells, the adjustable means greatly increased the cost and complexity of operation of the flow cell assembly.

It is therefore a principal object of this invention to provide a flow cell for spectroscopic analysis of density gradients which overcomes all of the problems described hereinabove.

Another object is to provide an improved flow cell of the character described which substantially eliminates turbulent flow and optical noise resulting therefrom.

A further The is to provide a flow cell of the character described which combines ideal hydrodynamic shape with small volume and optimal light path to obtain maximum resolution and sensitivity. A releated object is to provide a flow path having no sharp corners or other discontinuities which, it is now believed, might be a prime cause of residual turbulence.

Still another object is to provide an improved flow cell of the character described which may be inexpensively manufactured and yet is most efficient, durable and easily maintained.

With the foregoing and other objects in view which will appear as the description proceeds, the invention comprises generally a flow cell having an elongated internal cavity or flow path which is streamlined and totally free of any sharp steps or interruptions. The inlet and outlet orifices of the cell correspond exactly to the inside diameter of the tubing which carries the fluid to and from the cell, and the cavity tapers gradually to its greatest width at the point of the light path. On the other hand, the tapering cavity is kept narrower in a direction perpendicular to the light path to maintain minimum volume for the entire flow path. The light path itself is defined by longitudinally extending ovate openings formed in the walls of the flow path.

Quartz windows are removably supported against the ovate openings to seal the flow cell and cooperate with knife-edge boundaries of the openings to provide a step-free interior flow path surface. The cell is formed of two identical and cooperating mirror-image halves which may be readily connected in liquid-tight relationship and disassembled for maintenance and cleaning.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

FIG. 1 is a side elevational view of a flow cell embodying the principles of the invention;

FIG. 2 is a vertical sectional view taken on the plane of line 2—2 in FIG. 1;

FIG. 3 is a vertical sectional view taken on the plane of line 3—3 in FIG. 2 and comprising a plan view of the inside surface of one of the identical halves of the flow cell;

FIG. 4 is a horizontal sectional view taken on the plane of line 4—4 in FIG. 1; and FIG. 5 is a greatly enlarged detail view of the flow path area shown in FIG. 4.

Referring more particularly to the various Figures of the drawings, reference character 10 indicates generally a flow cell embodying the principles of the invention. Flow cell 10 comprises an opaque, generally rectangular block having side walls 12, 12, end walls 14, 14, a top or inlet wall 16 and a bottom or outlet wall 18.

Projecting upwardly from the top wall 16 is an annular collar 20 which retains therein inlet tubing such as 22 through which the gradient analysis fluid is delivered to the flow cell. It is important to note that the circular bore 24 of the collar 20 projects inwardly for a short distance beyond the top wall 16 and terminates in an annular shoulder 26 whose depth is equal to the thickness of the inlet tubing wall. At its opposite end, the flow cell 10 comprises a circular bore 28 which opens to the bottom wall 18 and retains therein tubing 22 through which the gradient analysis fluid is carried from the flow cell after it has passed therethrough. Once again, it will be noted that the bore 28 terminates in an annular shoulder 30 whose depth is equal to the thickness of the wall of the tubing 22.

Extending between the shoulders 26 and 30 is the fluid flow path indicated generally by the numeral 35. Flow path 35 comprises a cavity having an inlet orifice 36 and an outlet orifice 38 both of which are circular in cross-section. It will thus be appreciated that the two orifices correspond exactly to the inside diameter of the tubing 22. Between the orifices 36 and 38, the cavity widens or tapers, preferably as a gradual curve, to a medial area. This outward taper varies in severity or degree in two perpendicular planes, one of which comprises the longitudinal plane of the spectrophotometer light path through the flow cell (see arrows in FIGS. 2 and 5).

Referring specifically to FIG. 3, the curve 40 in the longitudinal plane perpendicular to the light path is of large radius and extremely gradual and comprises the minimal enlargement feasible consistent with the materials of construction and hydrodynamically perfect flow path. In the longitudinal plane of the light path, however, the curve 42 is of smaller radius and considerably more severe to provide the longest feasible light path (see FIG. 2). Flow path 35 thus may be said to comprise a pair of circular-section end orifices which taper arcuately and outwardly into a cavity of elliptical section which achieves its greatest dimension at a medial area where the light path comprises the major axis of the ellipse (see FIGS. 4 and 5).

The light path itself is defined by a pair of opposed, longitudinally-extending, narrow oval openings 44, 44 communicating with the fluid path 35. As indicated in FIGS. 2 and 4, a threaded opening 46 is formed in each side wall 12 to provide a recess 47 and planar wall 48 in which the oval openings 44 are formed. It is important to note that the oval openings 44 are defined by an extremely fine knife edge 49 resulting from the conjunction of the taper 40 and planar wall 48 (see FIG. 5).

Suitably sized windows 50, of quartz or the like, are tightly supported against the planar walls 48 by means of O-rings 52 and ring-shaped screws 54.

For ease of maintenance and low cost manufacture, flow cell 10 preferably comprises a pair of identical and cooperating mirror-image body members 55, 55 which may be relatively inexpensively fabricated of suitable plastics by injection molding. Each of the body members 55 is thus provided with a plurality of screw threaded openings 56 (8 in the embodiment illustrated) which accommodate screws 58 to insure a perfect fluid-tight seal between the two body members. In this regard, the inner wall 60 of each body member is precision-machined to provide a perfectly planar surface.

Expressions such as "top", "bottom", "inlet", and "outlet" have been employed herein for convenience and ease of description, and the same are not to be construed as limiting in any way on the structure or operation of the invention. Thus, for example, the flow cell could be inverted or rotated 180° from the orientation illustrated in order to fit within certain commercial cuvette holders to bring the openings 44 into alignment with a light beam of the spectrophotometer. In this regatd, it will be noted that the openings 44 are asymmetrically positioned with relation to the outer walls 16 and 18.

From the foregoing description and illustration, it will be appreciated that I have provided a flow cell having a flow path which is totally free of steps or interruptions and has virtually ideal hydrodynamic configuration. The flow cell likewise combines that configuration with minimal volume and maximized light path for optimum spectrophotometric resolution and sensitivity. In a representative form of the embodiment illustrated, the flow path expands from an orifice dimension of approximately 1 mm to a light path of 4 mm and the outside dimensions of the cell correspond to the 10 mm × 10 mm of standard cuvette holders to permit use in most commercial spectrophotometers without special adapters.

The superior performance of the turbulence-free flow cell has been manifested in substantial improvements in resolution and sensitivity. While the advantages of improved resolution are immediately evident, the importance of improved sensitivity is equally significant. INcreased sensitivity offers invaluable advantages because the materials under analysis are often available in very limited quantities and are time-consuming to prepare. In addition, resolution generally improves with decreasing input. Since the smallest quantity detectable by the optical system depends on the signal to noise ratio, reduction or elimination of the optical noise by reducing turbulence makes it possible to obtain good results with smaller input quantities and greater amplification factors.

Wherease the cell described in my co-pending patent application required an input of at least 20–40 μg of nucleic acid, the turbulence-free flow cell produces perfectly smooth and noise-free curves in the 5–10 μg range and with an amplification that allows recording at a scale factor of 0.1 $A_{260}$ full scale. This increase in sensitivity greatly increases the analytical usefulness and range of the method.

The improvement in resoltuion is illustrated by the fact that it is now possible to distinguish objects differing only by 3–5 percent in sedimentation rate compared to a lower limit of 6–10 percent with my earlier flow cell. Thus it has been possible for the first time to resolve the 28S peak of R17 RNA from the 30S peak corresponding to the smaller subunit of bacterial ribosomes.

The increase in resolution made possible by the turbulence-free flow cell described here has extended the range of the method of ultracentrifugal analysis to permit the study of phenomena previously beyond its scope, such as the important field of conformational changes of macromolecules resulting from allosteric interactions.

What I claim is:

1. A flow cell for use in spectroscopic analysis comprising:
   an opaque body block;
   a fluid flow path in said body block having an inlet orifice, an outlet orifice and an elongated conduit therebetween,
   said conduit tapering smoothly outwardly between said orifices to a medial area of maximum dimensions;
   a pair of aligned, narrow openings formed in opposed sides of said body block to define a transverse light path through said medial area;
   light-permeable means closing said openings; and
   means associated with said flow path for retaining inlet and outlet tubing having an inside diameter substantially identical with the diameter of said orifices in communication therewith,
   whereby fluids pass through the step-free and streamlined flow path in substantially pure laminar flow.

2. A flow cell of claim 1 in which said flow path comprises a cavity formed within said body block.

3. The flow cell of claim 2 in which said last-mentioned means comprises:
   a pair of bores formed in said body block and opening respectively to opposite ends thereof,
   said bores terminating internally in an annular shoulder of depth equal to the thickness of the tubing wall,
   said bores and shoulders cooperating to retain said inlet and outlet tubing in contour-accommodating relation-ship whereby the same are in intimate communication with their respective orifices.

4. The flow cell of claim 1 in which each of said openings comprises a longitudinally extending oval defined by a knife edge boundary.

5. The flow cell of claim 4 in which the body block opposed sides surrounding said openings comprise thin planar walls cooperating with said tapering conduit to provide said knife-edge boundaries,
   said light-permeable means comprising planar windows retained against said planar walls.

6. The flow cell of claim 5 and comprising further:
   an annular opening formed in each of the body block opposed sides surrounding said ovals and providing said planar walls, and
   means for releasably retaining said windows against said planar walls.

7. The flow cell of claim 6 in which said last-mentioned means comprises a ring-shaped screw adapted to co-operate with internal threading formed in said annular openings for releasably retaining said windows against said oval openings in fluid-tight relationship.

8. The flow cell of claim 3 in which said body block comprises a pair of mirror-image body members and means for releasably connecting said body members together in fluid-tight relationship.

9. The flow cell of claim 8 in which said conduit taper is defined by a first pair of curves in a longitudinal plane including the light path and said conduit comprises further a second taper in a longitudinal plane perpendicular to the first longitudinal plane defined by a second pair of curves of larger radius so that the conduit is ovate in section.

10. The flow cell of claim 9 in which said last-mentioned means comprises threaded screws and said body members are formed with a plurality of screw threaded holes for receiving said screws.

* * * * *